US011210362B2

(12) United States Patent
Brust et al.

(10) Patent No.: US 11,210,362 B2
(45) Date of Patent: Dec. 28, 2021

(54) SCRIPT LOGGING FOR MARKUP LANGUAGE ELEMENTS

(71) Applicant: International Business Machines Corporation, Armonk, NY (US)

(72) Inventors: Nicholas L. Brust, Raleigh, NC (US); Bernadette A. Carter, Raleigh, NC (US); Joshua M. Small, Cary, NC (US); Michael K. Sodomsky, Hampstead, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1177 days.

(21) Appl. No.: 14/292,841

(22) Filed: May 31, 2014

(65) Prior Publication Data

US 2015/0347609 A1    Dec. 3, 2015

(51) Int. Cl.
| | |
|---|---|
| *G06F 40/143* | (2020.01) |
| *G06F 16/958* | (2019.01) |
| *H04L 29/08* | (2006.01) |
| *G06F 16/957* | (2019.01) |
| *G06F 40/117* | (2020.01) |
| *G06F 40/169* | (2020.01) |
| *G06F 40/197* | (2020.01) |

(52) U.S. Cl.
CPC ........ *G06F 16/958* (2019.01); *G06F 16/9577* (2019.01); *G06F 16/986* (2019.01); *G06F 40/117* (2020.01); *G06F 40/143* (2020.01); *G06F 40/169* (2020.01); *G06F 40/197* (2020.01); *H04L 67/02* (2013.01)

(58) Field of Classification Search
CPC .................. G06F 17/2247; G06F 17/3089
USPC .................. 715/200, 229, 230, 234, 241
See application file for complete search history.

(56) References Cited

U.S. PATENT DOCUMENTS

| | | | | |
|---|---|---|---|---|
| 6,907,546 | B1 * | 6/2005 | Haswell | G06F 11/3684 714/38.11 |
| 6,985,901 | B1 * | 1/2006 | Sachse | H04L 41/5032 |

(Continued)

FOREIGN PATENT DOCUMENTS

| | | |
|---|---|---|
| KR | 20130040255 A | 4/2013 |
| TW | 201037531 A | 10/2010 |

OTHER PUBLICATIONS

IBM: List of IBM Patents or Patent Applications Treated as Related.

(Continued)

*Primary Examiner* — Keith D Bloomquist
(74) *Attorney, Agent, or Firm* — Cuenot, Forsythe & Kim, LLC

(57) ABSTRACT

Determining interactions between scripts and elements of a markup language document includes loading a markup language document into a browser. The markup language document includes a plurality of markup language elements. A call from within the markup language document to a method specified by a script is detected. The markup language element of the plurality of markup language elements that is modified by execution of the method is determined using the processor. Log data is stored that includes a name of the modified markup language element in association with a name of the method.

8 Claims, 4 Drawing Sheets

(56) References Cited

U.S. PATENT DOCUMENTS

| | | | |
|---|---|---|---|
| 8,015,549 B2* | 9/2011 | Cooper | G06F 11/362 |
| | | | 717/124 |
| 8,245,200 B2* | 8/2012 | Baierl | G06F 11/3624 |
| | | | 717/130 |
| 2005/0193269 A1* | 9/2005 | Haswell | G06F 11/3684 |
| | | | 714/38.13 |
| 2008/0021922 A1* | 1/2008 | Hailpern | G06F 8/33 |
| 2009/0063968 A1 | 3/2009 | Wenig et al. | |
| 2009/0083155 A1* | 3/2009 | Tudor | G06Q 30/0273 |
| | | | 705/14.69 |
| 2010/0174774 A1* | 7/2010 | Kern | G06F 17/30861 |
| | | | 709/203 |
| 2010/0268759 A1* | 10/2010 | Hepper | H04L 67/02 |
| | | | 709/203 |
| 2011/0264787 A1* | 10/2011 | Mickens | G06F 11/3414 |
| | | | 709/224 |
| 2011/0296246 A1* | 12/2011 | Cooper | G06F 11/362 |
| | | | 714/38.1 |
| 2011/0320880 A1* | 12/2011 | Wenig | G06F 11/3414 |
| | | | 714/39 |
| 2012/0023156 A1 | 1/2012 | Tomoaki | |
| 2012/0110435 A1 | 5/2012 | Green | |
| 2012/0151274 A1* | 6/2012 | Liberty | G06F 11/366 |
| | | | 714/45 |
| 2013/0232402 A1* | 9/2013 | Lu | G06F 17/30861 |
| | | | 715/234 |
| 2013/0232424 A1* | 9/2013 | Nakagoe | G06F 3/0484 |
| | | | 715/738 |
| 2014/0359571 A1* | 12/2014 | Sasikumar | G06F 8/35 |
| | | | 717/110 |
| 2015/0052108 A1* | 2/2015 | Volk | G06F 11/1446 |
| | | | 707/649 |
| 2015/0087277 A1 | 3/2015 | Liang | |
| 2015/0347359 A1 | 12/2015 | Brust et al. | |
| 2016/0011928 A1* | 1/2016 | Fujiwara | G06F 11/3476 |
| | | | 714/45 |

OTHER PUBLICATIONS

Brust et al., "Script Logging for Markup Language Elements," U.S. Appl. No. 14/614,653, filed Feb. 5, 2015, 26 pages. (A copy is not provided as this application is available to the Examiner).

IBM: List of IBM Patents or Patent Applications Treated as Related (Appendix P).

"How can I log an HTML element as a JavaScript?" [online] Stack Exchange, Inc. © 2014, Mar. 9, 2012 [retrieved May 30, 2014] retrieved from the Internet: <http://stackoverflow.com/questions/9633835/how-can-i-log-an-html-element-as-a-javascript-object>, 2 pg.

* cited by examiner

SCRIPT LOGGING FOR MARKUP LANGUAGE ELEMENTS

BACKGROUND

Web pages may be classified as static or dynamic. A static Web page is one that is delivered to a client system as stored on the server. The client system displays the Web page, e.g., using a browser, as received from the server. Except for technical capabilities of the client system and/or the browser that may vary from one machine to the next, a static Web page will display the same for all users and across all contexts.

By comparison, a dynamic Web page generally relies upon one or more scripts that are executed within the client system to change some aspect of the Web page. For example, one or more scripts may be used within the client system to parse the Web page into a Document Object Model (DOM) representing the loaded Web page. The script(s) may dynamically modify one or more portions of the DOM resulting in a change in Web page structure, behavior, and/or manner of presentation (e.g., display) in the client system.

The dynamic nature of modern Web pages provides many advantages. Interactions between the Web page and the scripts used to operate upon the Web page, however, are often complex. This complexity makes the debugging process difficult and time consuming.

SUMMARY

A method includes loading a markup language document into a browser, wherein the markup language document includes a plurality of markup language elements, detecting, using a processor, a call from within the markup language document to a method specified by a script, and determining, using the processor, a markup language element of the plurality of markup language elements that is modified by execution of the method. Log data including a name of the modified markup language element in association with a name of the method is stored.

A system includes a processor programmed to initiate executable operations. The executable operations include loading a markup language document into a browser, wherein the markup language document includes a plurality of markup language elements, detecting a call from within the markup language document to a method specified by a script, and determining a markup language element of the markup language document modified by execution of the method. The executable operations further include storing log data including a name of the modified markup language element in association with a name of the method.

A computer program includes a computer readable storage medium having program code stored thereon. The program code is executable by a processor to perform a method. The method includes loading, using the processor, a markup language document into a browser, wherein the markup language document comprises a plurality of markup language elements, detecting, using the processor, a call from within the markup language document to a method specified by a script, and determining, using the processor, a markup language element of the plurality of markup language elements that is modified by execution of the method. Log data including a name of the modified markup language element in association with a name of the method is stored using the processor.

DETAILED DESCRIPTION

Figure 1:
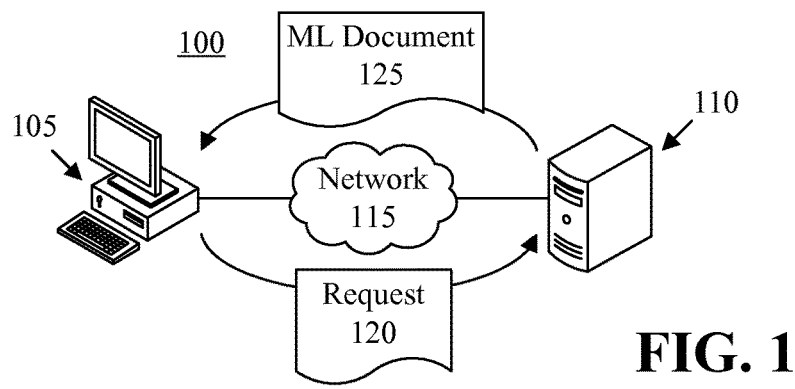
FIG. 1 is a block diagram illustrating an example of a communication system.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to logging interactions between scripts and a markup language document. In accordance with the inventive arrangements described herein, interactions between the markup language document and one or more methods of a script are monitored. A browser executed within a data processing system loads the markup language document. In one aspect, calls to methods implemented using scripts are detected. Interaction between the method that is executed and one or more elements of the markup language document are observed. The interactions may be stored for later use and/or evaluation.

In illustration, a call to a method specified as a script may be detected. Any interaction between the script and particular elements of the markup language document may be determined and stored. For example, any change to a data item of a markup language element of the markup language document may be detected and stored. The interaction may be stored as one or more entries in a log. The entries may specify a name of the method changing the markup language element, the particular markup language element that was accessed or modified, the particular data items of the markup language element that were modified, and the like.

The log may include a record of interactions between markup language element(s) and methods beginning with the loading of the markup language document within the browser, and continuing to a point in time subsequent to loading. For example, the log may include interactions between markup language elements and methods that occur responsive to received user input subsequent to completion of the loading process.

Several definitions apply throughout this document and are presented below. As defined herein, the term "automatically" means without user intervention. As defined herein, the term "user" means a person and, in particular, a human being.

As defined herein, the term "processor" means at least one hardware circuit configured to carry out instructions contained in program code. A processor may be implemented as a semiconductor integrated circuit. Examples of a processor include, but are not limited to, a central processing unit (CPU), an array processor, a vector processor, a digital signal processor (DSP), a field-programmable gate array (FPGA), an application specific integrated circuit (ASIC), and a controller.

As defined herein, a "markup language document" is an electronic file that includes annotations that are syntactically distinguishable from the content or text of the file. A markup language document is organized into a hierarchy, e.g., a tree, where the annotations provide structure to the document. The annotations within a markup language document typically are referred to as "tags." One example of a markup language document is a HyperText Markup Language (HTML) document also referred to as a "Web page."

As defined herein, a "markup language element" is a portion of a markup language document that begins with a start (opening) annotation, or tag, and ends with an end (closing) annotation or tag. An example of a markup language element appears as <start tag> content/text </end tag>. The content that is annotated using the start annotation and end annotation appears between the two respective annotations. The annotations describe the content included therein, provide display instructions, or the like to a browser or other program that interprets, e.g., renders or executes, the markup language document. A markup language element may be embedded within another markup language element thereby resulting in the hierarchical, or tree, structure as previously noted. An example of a markup language element is an HTML element as delineated using a start HTML tag and end HTML tag.

As defined herein, "loading" a markup language document means the process of storing the markup language document in execution memory of a data processing system and a processor of the data processing system executing the markup language document so that the markup language document is rendered and/or displayed within a browser. Loading of the markup language document ends responsive to the browser reaching a steady state condition after loading has begun, e.g., prior to receipt of any user input through the markup language document.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating an example of a communication system 100. Communication system 100 includes a client system 105 and a server 110 communicatively linked through a network 115. Client system 105 and server 110 each may be implemented as a data processing system. While pictured as a desktop computing system, it should be appreciated that client system 105 may be implemented in any of a variety of different form factors. For example, client system 105 may be implemented as a mobile device such as a smart phone, a tablet, a laptop or other portable computing device, or the like. Similarly, pictured as a stand-alone data processing system, server 110 may be implemented as one or more interconnected data processing systems, as a virtual machine executing within a physical data processing system, or the like.

Network 115 is the medium used to provide communication links between client system 105 and server 110 within communication system 100. Network 115 may include connections, such as wires, wireless communication links, or fiber optic cables. Network 115 may be implemented as, or include, any of a variety of different communication technologies such as a Wide Area Network (WAN), a Local Area Network (LAN), a wireless network, a mobile network, a Virtual Private Network (VPN), the Internet, the Public Switched Telephone Network (PSTN), or the like.

In operation, data processing system 105 sends a request 120 to server 110. Request 120 is a request for a particular markup language document. For example, client system 105 requests a particular Web page or HTML document from server 110. In response to request 120, server 110 sends markup language document 125 to client system 105. Client system 105 may load the markup language document for display or otherwise render the markup language document to a user. For example, client system 105 may execute a browser that issues request 120 and loads markup language document 125.

FIG. 1 is provided for purposes of illustration only and is not intended as a limitation of the inventive arrangements described within this disclosure. It should be appreciated that a markup language document may be obtained through any of a variety of different mechanisms and/or communication protocols. Further, in some cases, a markup language document such as a Web page may be stored locally within client system 105. A user, for example, may be developing or creating a Web page that requires testing and/or debugging. Accordingly, the markup language document may be stored locally within client system 105 and loaded into a browser.

Figure 2:
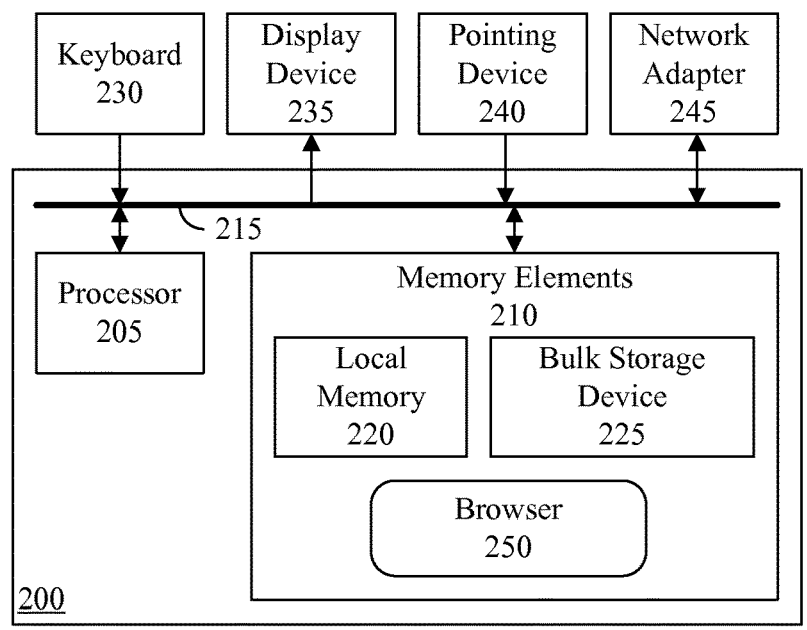
FIG. 2 is a block diagram illustrating an exemplary architecture for a data processing system.

FIG. 2 is a block diagram illustrating an exemplary architecture 200 for a data processing system. Architecture 200 may be used to implement client system 105 of FIG. 1. Architecture 200 may include at least one processor 205 coupled to memory elements 210 through a system bus 215 or other suitable circuitry. Architecture 200 may store program code within memory elements 210. Processor 205 executes the program code accessed from memory elements 210 via system bus 215 or the other suitable circuitry.

In one aspect, architecture 200 may be used to implement a computer or other programmable data processing apparatus that is suitable for storing and/or executing program code. Architecture 200, however, may be used to any system including a processor and memory that is capable of performing and/or initiating the functions and/or operations described within this disclosure. Further, a data processing system that uses architecture 200 may be implemented in any of a variety of different form factors.

Memory elements 210 include one or more physical memory devices such as, for example, local memory 220 and one or more bulk storage devices 225. Local memory 220 refers to random access memory (RAM) or other non-persistent memory device(s) generally used during actual execution of the program code. Bulk storage device(s) 225 may be implemented as a hard disk drive (HDD), solid state drive (SSD), or other persistent data storage device. Architecture 200 may include one or more cache memories (not shown) that provide temporary storage of at least some program code in order to reduce the number of times program code must be retrieved from bulk storage device 225 during execution. In general, memory elements 210, local memory 220, and/or bulk storage device 225 are examples of computer readable storage media or computer readable storage mediums.

Input/output (I/O) devices such as a keyboard 230, a display device 235, and a pointing device 240 optionally can be coupled to architecture 200. The I/O devices may be coupled to architecture 200 either directly or through intervening I/O controllers. One or more network adapters 245 also may be coupled to architecture 200 to enable a system implemented using architecture 200 to become coupled to other systems, computer systems, remote printers, and/or remote storage devices through intervening private or public networks. Modems, cable modems, wireless transceivers, and Ethernet cards are examples of different types of network adapters 245 that can be used with architecture 200.

As pictured, memory elements 210 store a browser 250. Browser 250 is implemented as program code that is executed by processor 205. As such, browser 250 is considered an integrated part of a system implemented using architecture 200. Architecture 200, in executing browser 250, performs and/or initiates the various functions and/or operations described within this disclosure. Further, browser 250, including any other modules, plug-ins, data items, or the like utilized by browser 250, are functional data structures that impart functionality when employed as part of a system implemented using architecture 200.

Figure 3:
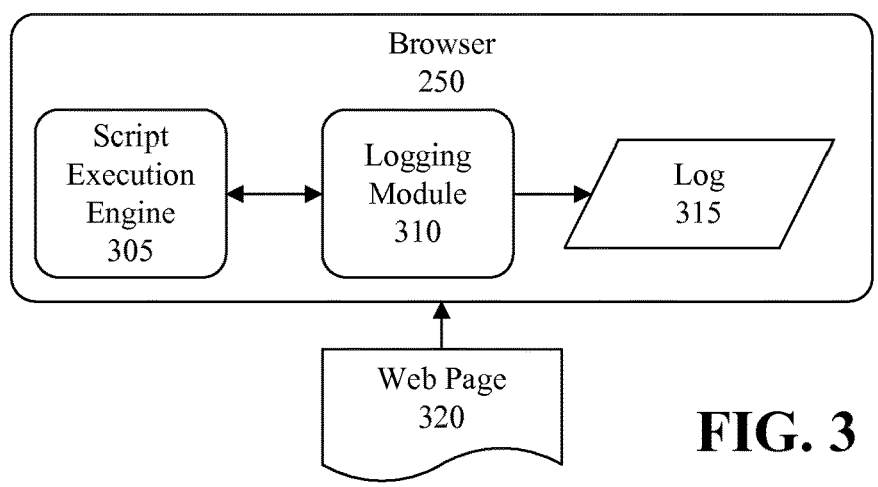
FIG. 3 is a block diagram illustrating an exemplary implementation of a browser.

FIG. 3 is a block diagram illustrating an exemplary implementation of browser 250. Browser 250 includes a script execution engine (engine) 305. Browser 250 further includes a logging module 310. Engine 305 is implemented as program code that executes scripts. In one example, engine 305 is implemented as a JavaScript engine that executes JavaScript objects. Engine 305, for example, may be a virtual machine that interprets JavaScript objects within browser 250.

Logging module 310 interacts with engine 305. Logging module 310, for example, may communicate with engine 305 through an application programming interface (API) of engine 305. In one aspect, logging module 315 may be implemented as a plug-in or as an extension of browser 250 that is programmed to access engine 305 via the exposed API as described. In another aspect, logging module 310 may be a native part of browser 250.

Logging module 310 determines a variety of different types of data relating to script execution by engine 305. For example, logging module 310 is able to detect when engine 305 executes a script, determine the particular method of the script that is executed, provide instructions to pause, continue, and/or perform other operations pre-script execution and/or post script execution, determine which markup language elements of the markup language document have been modified through execution of the method of the script, which data items within the markup language element have been changed, and the like.

One or more or all of the aforementioned data items determined by logging module 310 are stored within log 315 in memory. Log 315, also referred to as "log data," further may be stored in persistent memory in one or more of the various memory devices previously described within this disclosure. In one aspect, log 315 is stored memory of browser 315. Logging module 310 may store additional information such as markers delineating different stages of execution of the markup language document within browser 250, or the like. The list of data items that may be detected and stored by logging module 310 is not intended to be exhaustive.

In operation, browser 250 loads a markup language document depicted as Web page 320. Logging module 310 detects when a call to a method specified in a script is executed from Web page 320 by browser 250. For example, logging module 310 may detect a call, specified in the HTML source code of Web page 320, to a method when executed. Logging module 310 may be configured to monitor for the modification of only one or more selected HTML elements or of all HTML elements by execution of a method.

Continuing, logging module 310 determines that a selected HTML element of Web page 320 is modified by execution of the method by engine 305. Logging module 310 determines which data item(s) of the selected HTML element are modified. Logging module 310 stores the name of the method, an identifier of, or other reference to, the HTML element, and the data item(s) of the HTML element that are modified as one or more entries within log 315. Logging module 310 further may store the particular object, or script, to which the method belongs and a time stamp for the entry or entries as the case may be. Each entry may specify one or more changes to a single markup language element.

Figure 4:
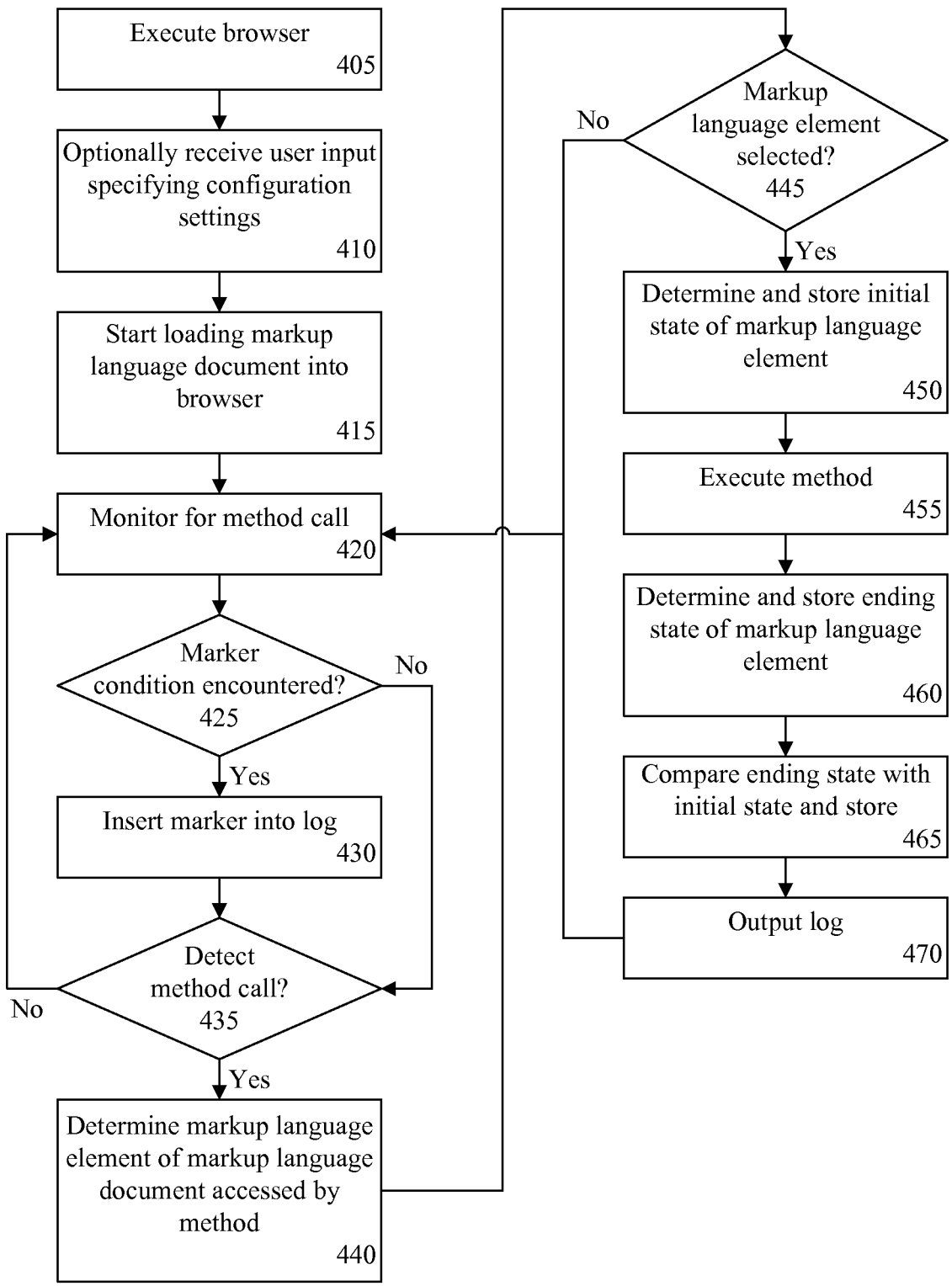
FIG. 4 is a flow chart illustrating an exemplary method of script logging.

FIG. 4 is a flow chart illustrating an exemplary method 400 of script logging. Method 400 may be performed by a data processing system (system) such as a client system as described with reference to FIGS. 1-3.

In block 405, the system begins executing a browser. In block 410, the system optionally receives user input specifying configuration settings. The configuration settings may be for the browser and/or for the logging module. The configuration settings indicate which markup language elements of a markup language document are to be monitored by the logging module. For example, the user may indicate that all interactions between methods of scripts and markup language elements, e.g., all markup language elements, are to be monitored. In another example, the user may specify that only one or more selected markup language elements are to be monitored for one or more different, enumerated markup language documents or Web pages. The logging module may have a default setting for monitoring that the user may accept or modify in block 410.

In block 415, the system begins loading a markup language document into the browser. In one aspect, the markup language document is retrieved from a server. In another aspect, the markup language document is retrieved from a local storage. The particular source from which the markup language document is retrieved is not intended as a limitation of the inventive arrangements described within this disclosure.

In block 420, the system begins monitoring for a method call. A "method call" means a call from the markup language document to a method that is specified as a script, e.g., is a method within a script or script object. For example, the logging module may monitor for the execution of a call from the markup language document specified in the markup language source code to a method that is specified by a script. The logging module may monitor for calls to methods that access, or modify, a selected markup language element of the markup language document in accordance with the configuration settings described with reference to block 410.

In block 425, the system determines whether a marker condition has been encountered. If so, method 400 continues to block 430, where a marker is inserted into the log that is created by the logging module. If not, method 400 continues to block 435. As defined herein, a "marker" is an indicator that is inserted into the log to mark or indicate the time or location within the log in which the marker condition is detected.

In one example, a marker condition is the completion of the loading process of the markup language document within the browser. Thus, responsive to the markup language being fully, or completely, loaded into the browser, the logging module inserts a marker into the log. The insertion of a marker after loading of the markup language document may be useful for debugging purposes to differentiate script actions performed during loading of the markup language document from script actions performed after loading the markup language document. Script actions occurring after a loading process, for example, may relate to user input received within the markup language document as rendered within the browser as opposed to the loading of the markup language document.

In another example, the marker condition may be the receipt of a user input in the markup language document rendered in the browser. For example, a user may provide an input by selecting a button, inserting text, or the like. Such an action may result in the insertion of a marker in the log to indicate that occurrence of the user input. In still another example, a marker condition may be a manual user request to insert a marker. For example, a control may be provided to a user, e.g., a developer, that, when selected, causes a marker to be inserted into the log. Responsive to the user selecting or activating the control, the logging module inserts a marker into the log.

In one aspect, markers may indicate the particular type of condition detected that initiated insertion of the marker into the log. For example, each marker may be identifiable within the log as a manual marker, a marker indicating that loading of the markup language document is complete, or a marker indicating that a user input is received. Each marker also may have a time stamp associated therewith to help create a timeline within the log and establish a placement or location of the marker in the log with respect to other entries.

In block 435, the system determines whether a method call has been detected. As described, the logging module may detect execution of a call to a method. Further, the logging module may communicate with the engine to determine when the engine is invoked to execute a method. In block 440, the system determines the particular markup language element of the markup language document that is accessed by the method. In one aspect, for example, the script including the called method may exist as source code or text that may be parsed or otherwise evaluated to identify a particular markup language element specified therein that is to be accessed or modified. In another aspect, the markup language element changed by the script is stored or otherwise represented within the log using a unique identifier. The system, for example, may determine a unique identifier for the markup language element, or DOM element, accessed by the method. The unique identifier may be a reference to the markup language element in memory that the browser uses to manage the markup language element.

In block 445, the system determines whether the markup language element is a selected element. If so, method 400 continues to block 450. If not, method 400 loops back to block 420 to continue monitoring for further script method calls. It should be appreciated that block 445 need only be performed when the monitoring is restricted to less than all markup language elements, e.g., particular markup language elements, of a markup language document.

In block 450, the system determines and stores an initial state for the markup language document and/or the markup language element that is to be accessed by the method. In illustration, the logging module may pause operation of the engine prior to execution of the method. The logging module further may determine and store the initial state of the markup language element that is accessed by the method. The initial state may include the value of any data item, e.g., attributes, of the markup language element. In one aspect, the initial state of the markup language document and/or markup language element may include an image of the markup language document and/or an image of the markup language element accessed by the method, as rendered within the browser prior to execution of the method.

In block 455, the system executes the method. The logging module, for example, allows the engine to continue, thereby executing the method. In block 460, the system determines and stores the ending state of the markup language document and/or markup language element. For example, the logging module again may pause the engine and determine the ending state for the markup language document and/or element. The ending state may be the same items of information stored as the initial state, albeit with the value(s) that exist after execution of the method. Further, the ending state information may include an image of the markup language document and/or an image of the markup language element, as rendered within the browser after execution of the method.

In block 465, the system compares the ending state with the initial state. The system determines, for example, which data items have changed as a consequence of executing the method, i.e., by the method. The system may store the comparison result within the log. Any images taken as part of the initial state information and/or the ending state information also may be included in the log. In block 470, the system outputs the log, or a portion thereof. The system may output, e.g., display, any data items that have been changed on a per markup language element basis, indicate the location of markers relative to changes to data items, and the like.

After block 470, method 400 may loop back to block 420 to continue executing. In one aspect, as part of continued execution, the system returns to execution of the markup language document. For example, the logging module allows the engine to continue, thereby returning from execution of the method to the markup language document.

Figure 5:
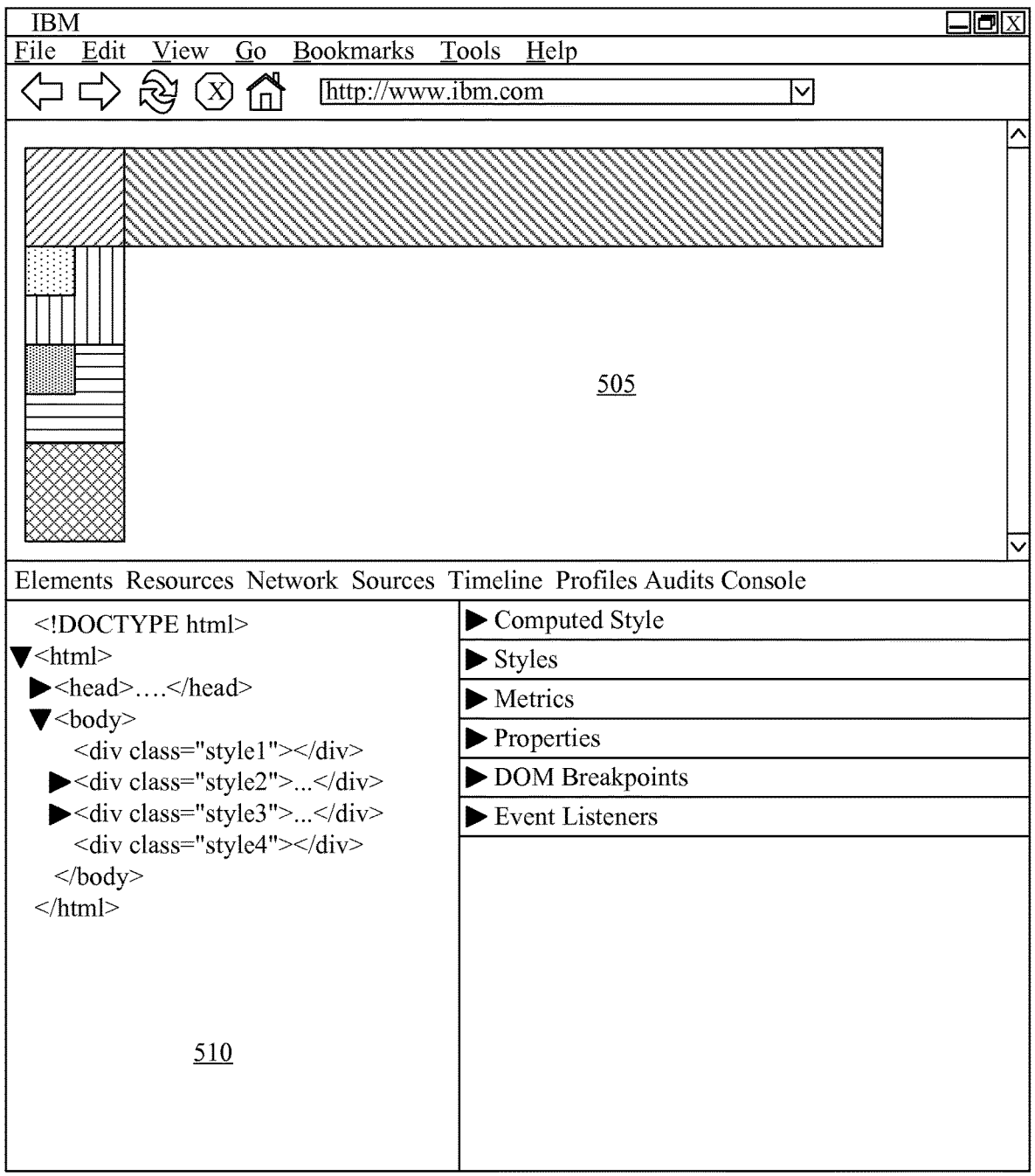
FIG. 5 is an exemplary view of a user interface of a browser.

FIG. 5 is an exemplary view of a user interface (UI) 500 of a browser. In the example UI 500, the markup language document is a Web page, i.e., an HTML document. As pictured, the Web page is rendered, or displayed, in window 505. The Web page, when rendered, causes a plurality of different rectangles to be displayed in a particular arrangement. Colors of the blocks are indicated with different patterns.

In window 510, the source code of the Web page document is displayed as part of a debugging process and/or tool within the browser. The source code of the Web page is HTML code. The logging module may be active and monitoring for method calls from the Web page to methods specified as scripts. For purposes of illustration, the methods are specified within JavaScript objects.

Figure 6:
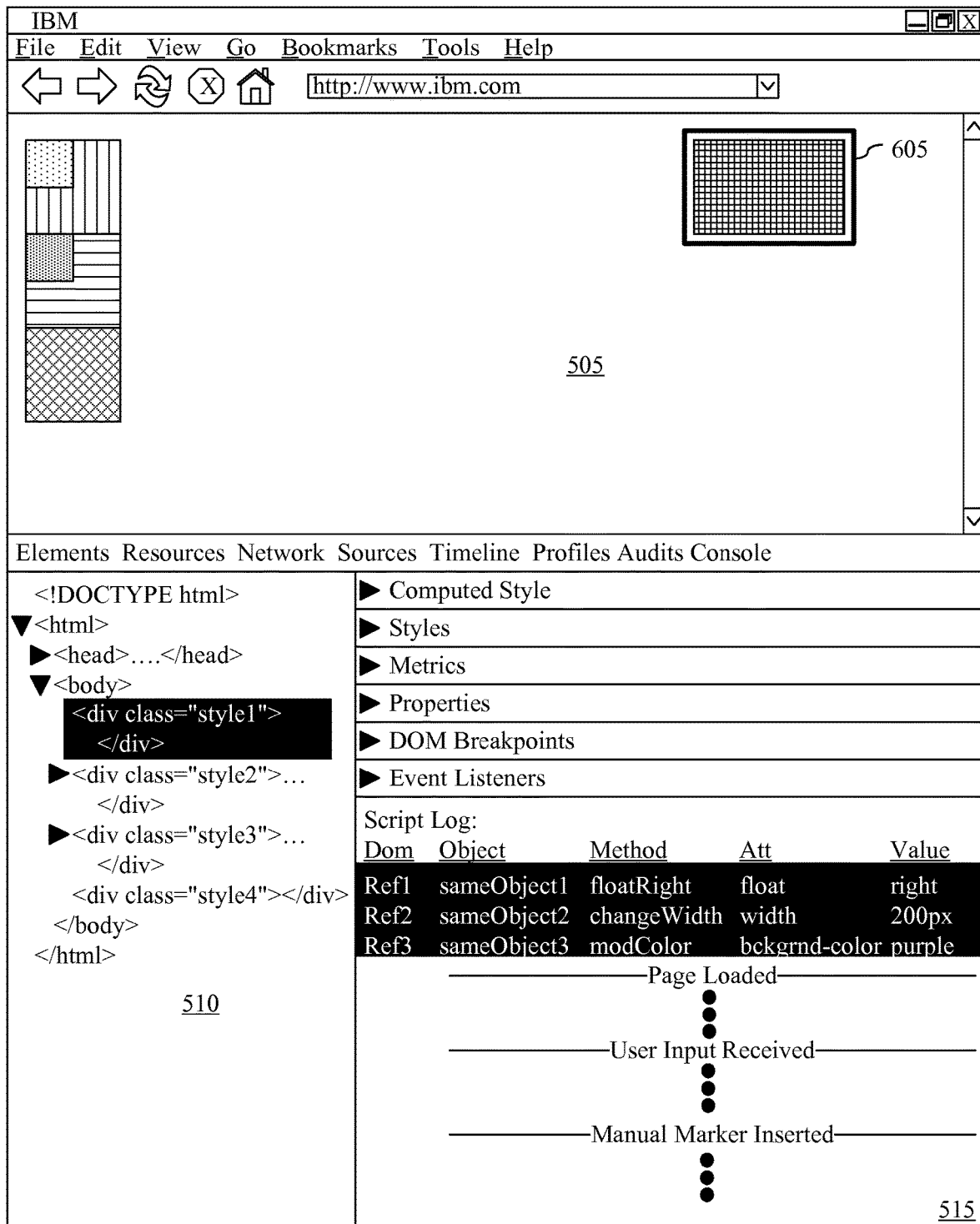
FIG. 6 is another exemplary view of the user interface of FIG. 5.

FIG. 6 is another exemplary view of UI 500 of FIG. 5. In the example of FIG. 6, the execution of a method of a JavaScript object has caused the rendering of the Web page in window 505 to change. In particular, the rectangles that are displayed and the positioning of the rectangles is changed. In window 510, the logging module has highlighted the particular HTML element that was changed by execution of the method. As pictured, the HTML element <div class="style1"></div> is highlighted. The visualization of the highlighted HTML element is also distinguished from other rendered HTML elements by a bounding box 605 in window 505. It should be appreciated that any of a variety of different visualization techniques may be used, such as applying a shadow, causing the object to blink, etc.

In window 515, at least a portion of the log generated by the logging module is displayed. Within window 515, the log indicates the particular object that includes the method that was executed, the method that was executed, the attribute that was modified, and the value written to the attribute. In the example shown, the particular log entries associated with the highlighted HTML element also are highlighted. The highlighted data displayed within window 515 are the changed data items for the highlighted HTML element of window 510 and the visualized HTML element in window 505 indicated by bounding box 605. In the example shown, "Ref1," "Ref2," and "Ref3" represent the unique identifiers that may be used for each markup language element as previously discussed.

In one aspect, a user input selecting an HTML element in window 510 may cause the system to automatically visually distinguish associated log entries in window 515 and/or the visualization of the HTML element in window 505. A user input selecting a log entry in window 505 may cause the system to automatically highlight the associated HTML element in window 510 and/or the visualization of the HTML element in window 505. Similarly, a user input selecting the visualization of the HTML element in window 505 may cause the system to automatically visually distinguish the HTML element in window 510 and/or the associated log entries in window 515. Though not pictured, the entries further may specify or show the unique identifier for the HTML element.

In the example of FIG. 6, each HTML element of the Web page may have associated therewith a list that includes the methods that changed the HTML element, the JavaScript object to which each method belongs, the attributes of the HTML element that were changed, and the value to which each such attribute was changed. The log for each HTML element would be readily accessible and sortable to provide quick and easy debugging with the ability to focus in on specific elements and attributes.

In another example, the log may be output and presented in a way that allows the user to sort and/or filter the log according to any of the various data types described herein and/or illustrated in window 515 across multiple markup language elements. For example, the user could display the log for multiple markup language elements concurrently, sort the list, filter the list according to any of the aforementioned data items, or the like.

Window 515 further illustrates a plurality of different markers that have been inserted into the log responsive to various mark conditions. As shown, after the Web page is completely loaded by the browser, a marker indicating "Page Loaded" is inserted into the log. Thus, any data above, or prior to, the marker "Page Loaded" occurred during loading of the Web page. Any data below, or after, the marker "Page Loaded" occurred subsequent to loading of the Web page.

Further markers are inserted such as "User Input Received." The "User Input Received" marker is inserted into the log responsive to detecting a received user input. The marker "Manual Marker Inserted" indicates that the marker is inserted responsive to a user request for insertion of a marker into the log. Though not pictured in FIG. 6, the log shown in window 515 may include time stamp information for the various entries including the markers. Further, markers may be color coded, or otherwise visually distinguished from one another to indicate type or the marker condition that caused insertion of the marker into the log.

In accordance with the inventive arrangements described within this disclosure, interactions between a markup language document and a method of a script may be monitored. A browser executed within a data processing system loads a markup language document. In one aspect, calls to methods implemented using scripts are detected. Interaction between the method that is executed and one or more elements of the markup language document are observed and may be stored for later use and/or evaluation. The stored interactions create a log, which effectively maps methods to the structural elements of a structured document upon which each method operates.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method within a client computer including a processor and a browser that includes a script engine and a logging module separate from the script engine, comprising:

loading, into the browser, a markup language document including a plurality of markup language elements;

detecting, using the logging module, a call from within the markup language document to a method specified by a script executed by the script engine;

determining, using the logging module, a markup language element of the plurality of markup language elements that is modified by execution of the method; and storing, using the logging module, log data that includes:
      a name of the modified markup language element,
      a name of the method that modified the markup language element, and
      an association between the name of the modified markup language and the name of the method.

2. The method of claim 1, wherein storing log data is performed only responsive to determining that the markup language element is selected for monitoring.

3. The method of claim 1, further comprising:
   storing an image comprising the markup language element.

4. The method of claim 1, further comprising:
   storing a first state of the markup language element prior to execution of the method; and
   storing a second state of the markup language element subsequent to execution of the method.

5. The method of claim 4, further comprising:
   determining a data item of the markup language element that changed from the first state to the second state.

6. The method of claim 5, wherein the first state and the second state are determined during loading of the markup language document into the browser.

7. The method of claim 5, wherein the first state and the second state are determined subsequent to loading the markup language document into the browser.

8. The method of claim 1, further comprising:
   detecting a marker condition; and
   responsive to detecting the marker condition, inserting a marker into the log data.

* * * * *